United States Patent
Chiu et al.

(10) Patent No.: US 10,275,181 B2
(45) Date of Patent: Apr. 30, 2019

(54) METHODS FOR SCHEDULING AND EXECUTING COMMANDS IN A FLASH MEMORY AND APPARATUSES USING THE SAME

(71) Applicant: Silicon Motion, Inc., Jhubei (TW)

(72) Inventors: Shen-Ting Chiu, Houlong Township (TW); Yi-Da Chen, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 15/863,531

(22) Filed: Jan. 5, 2018

(65) Prior Publication Data
US 2018/0341430 A1  Nov. 29, 2018

(30) Foreign Application Priority Data
May 26, 2017 (TW) .............................. 106117575 A

(51) Int. Cl.
*G06F 3/06* (2006.01)
(52) U.S. Cl.
CPC ............ *G06F 3/0659* (2013.01); *G06F 3/061* (2013.01); *G06F 3/0679* (2013.01)
(58) Field of Classification Search
CPC ....... G06F 3/0659; G06F 3/061; G06F 3/0679
See application file for complete search history.

(56) References Cited

U.S. PATENT DOCUMENTS

| | | | |
|---|---|---|---|
| 6,092,158 A * | 7/2000 | Harriman | G06F 13/1642 711/151 |
| 6,182,177 B1 * | 1/2001 | Harriman | G06F 13/18 710/112 |
| 8,037,234 B2 | 10/2011 | Yu et al. | |
| 2010/0082879 A1 | 4/2010 | McKean | |
| 2011/0131375 A1 * | 6/2011 | Noeldner | G06F 12/00 711/114 |

* cited by examiner

*Primary Examiner* — Aracelis Ruiz
(74) *Attorney, Agent, or Firm* — Wang Law Firm, Inc.

(57) ABSTRACT

The invention introduces a method for scheduling and executing commands in a flash memory, performed by a processing unit, including at least the following steps: reading information stored in a command profile space to determine whether a priority command is present in a command queue; de-queuing the priority command from the command queue and executing the priority command when the priority command is present in the command queue; and using a scheduling algorithm to select a simple read/write command from the command queue and executing the simple read/write command when no priority command is present in the command queue.

11 Claims, 5 Drawing Sheets

METHODS FOR SCHEDULING AND EXECUTING COMMANDS IN A FLASH MEMORY AND APPARATUSES USING THE SAME

CROSS REFERENCE TO RELATED APPLICATIONS

This Application claims priority of Taiwan Patent Application No. 106117575, filed on May 26, 2017, the entirety of which is incorporated by reference herein.

BACKGROUND

Technical Field

The present invention relates to flash memory, and in particular to methods for scheduling and executing commands in a flash memory and apparatuses using the same.

Description of the Related Art

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

The commands with different priorities are issued by the host and stored in a queue in the order of their arrival. Typically, a processing unit scans the commands in the queue and schedules the commands to be executed according to their priority. However, scanning and scheduling the commands in the queue takes too much time. Accordingly, what is needed are methods for scheduling and executing commands in a flash memory and apparatuses that use these methods to address the above drawbacks.

BRIEF SUMMARY

An embodiment of the invention introduces a method for scheduling and executing commands in a flash memory, performed by a processing unit, including at least the following steps: reading information stored in a command profile space to determine whether a priority command is present in a command queue; de-queuing the priority command from the command queue and executing the priority command when the priority command is present in the command queue; and using a scheduling algorithm to select a simple read/write command from the command queue and executing the simple read/write command when no priority command is present in the command queue.

An embodiment of the invention introduces an apparatus for scheduling and executing commands in a flash memory including at least a command queue; a command profile space; and a command profile generator. The command profile generator, coupled to the command queue and the command queue, monitors all commands being stored in the command queue by an access interface, and updates information stored in the command profile space according to attribute information of the commands, thereby enabling a processing unit to determine whether a priority command is present in the command queue according to the information stored in the command queue.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
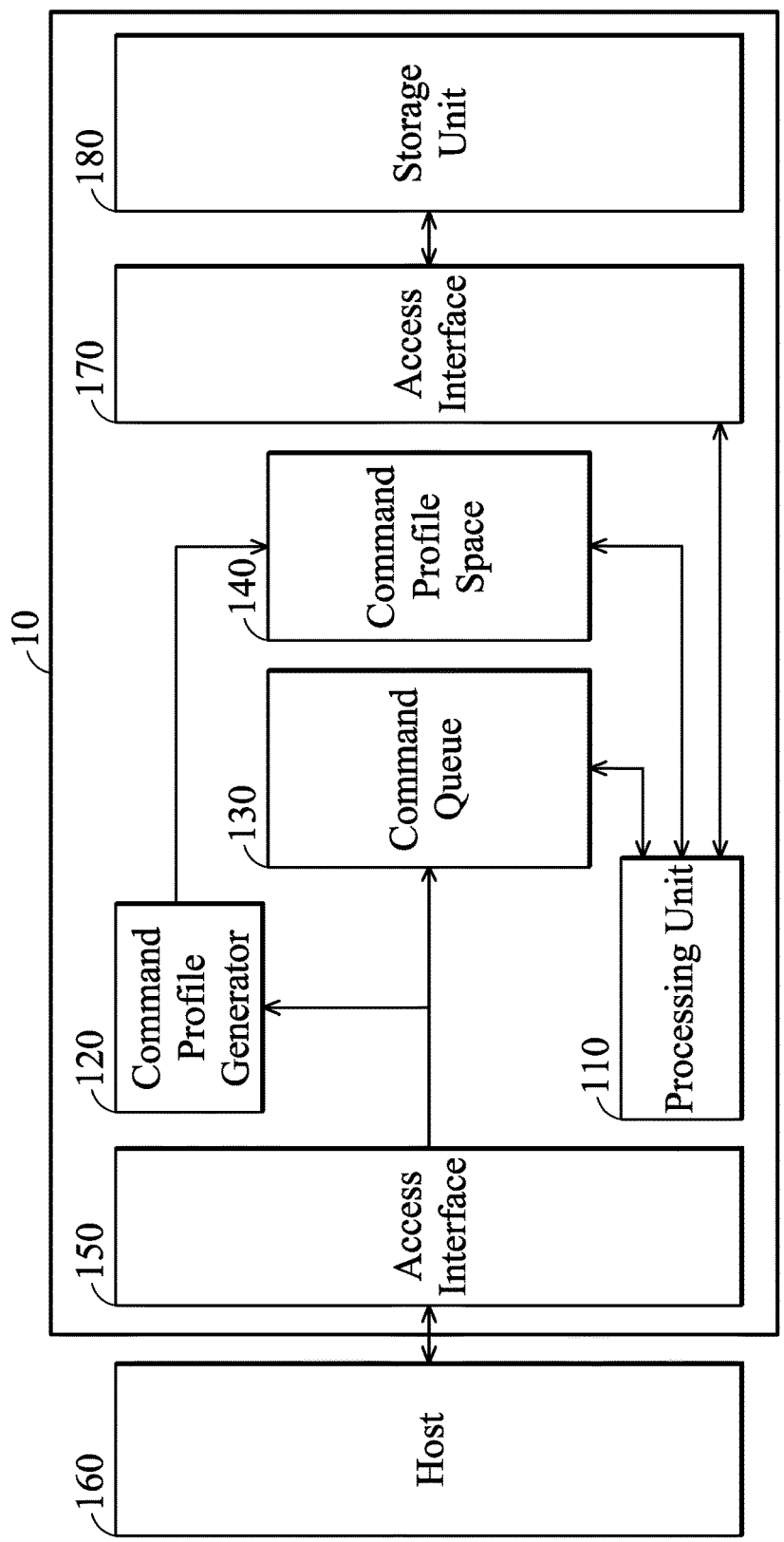
FIG. 1 is the system architecture of a flash memory according to an embodiment of the invention.

FIG. 1 is the system architecture of a flash memory according to an embodiment of the invention. The system architecture 10 of the flash memory contains a processing unit 110 configured to write data into a designated address of a storage unit 180, and read data from a designated address thereof. Specifically, the processing unit 110 writes data into a designated address of the storage unit 180 through an access interface 170 and reads data from a designated address thereof through the same interface 170. The processing unit 110 can be implemented in numerous ways, such as with dedicated hardware, or with general-purpose hardware (e.g., a single processor, multiple processors or graphics processing units capable of parallel computations, etc.) that is programmed using microcode or software instructions to perform the functions recited herein. The processing unit 110 may contain one or more ALUs (Arithmetic and Logic Units) and bit shifters. The ALU is responsible for performing Boolean operations (such as AND, OR, NOT, NAND, NOR, XOR, XNOR etc.) and also for performing integer addition and subtraction. The bit shifter is responsible for bitwise shifts and rotations. The system architecture 10 uses several electrical signals for coordinating commands and data transfer between the processing unit 110 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using a SDR (Single Data Rate) protocol or a DDR (Double Data Rate) protocol, such as ONFI (open NAND flash interface), DDR toggle, or others. The processing unit 110 may communicate with the host device 160 through an access interface 150 using a standard protocol, such as USB (Universal Serial Bus), ATA (Advanced Technology Attachment), SATA (Serial ATA), PCI-E (Peripheral Component Interconnect Express) or others.

Figure 2:
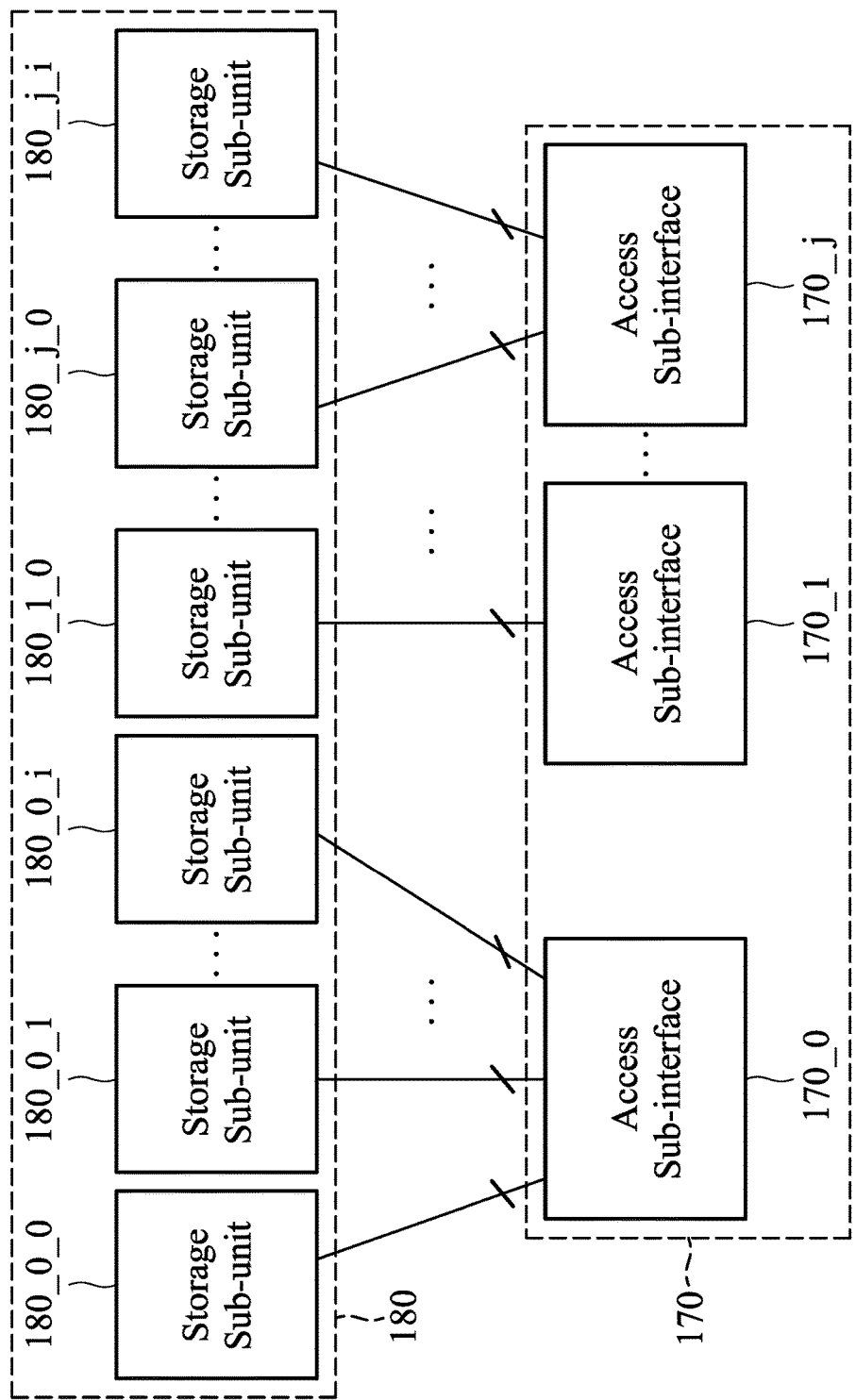
FIG. 2 is a schematic diagram illustrating interfaces to storage units of a flash storage according to an embodiment of the invention.
Figure 3:
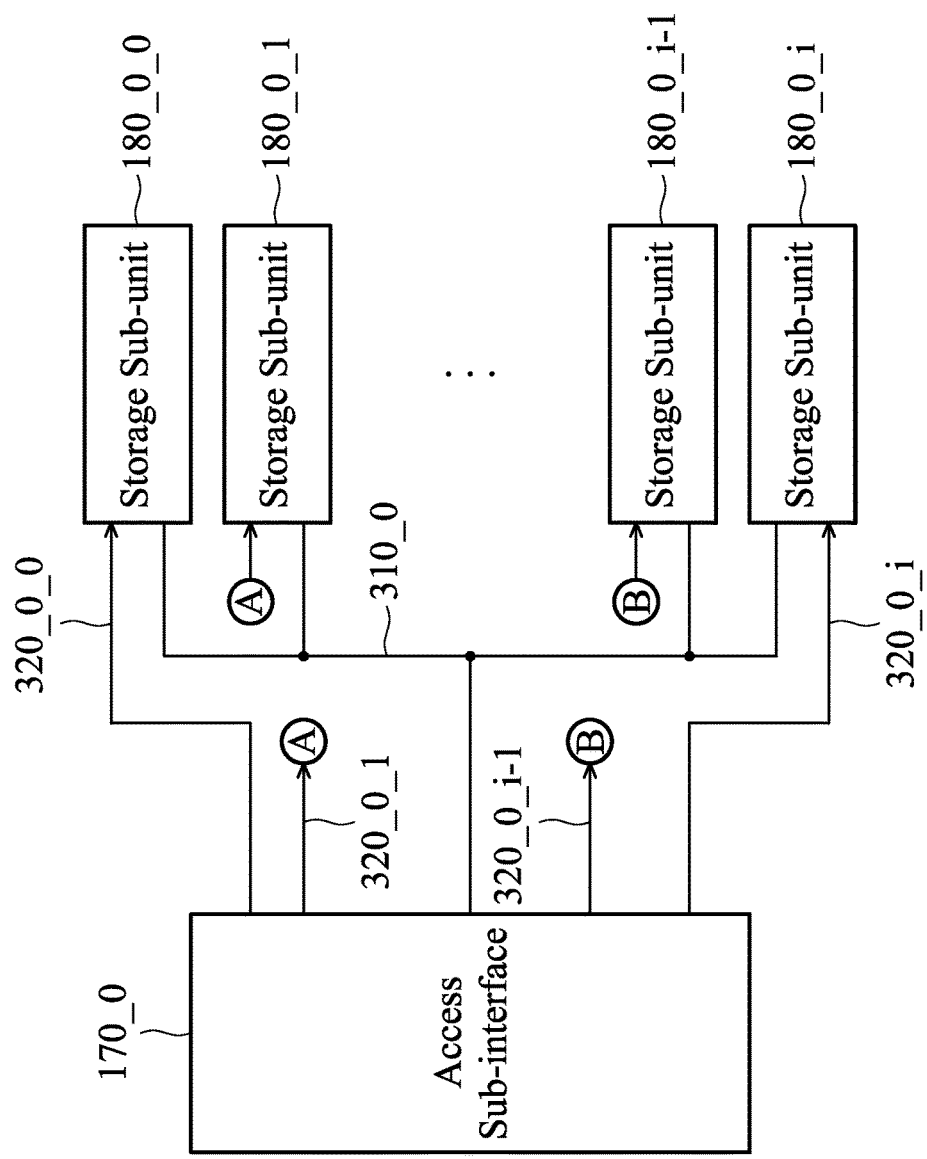
FIG. 3 is a schematic diagram depicting connections between one access sub-interface and multiple storage sub-units according to an embodiment of the invention.

The storage unit 180 may contain multiple storage sub-units and each storage sub-unit may be practiced in a single die and use an access sub-interface to communicate with the processing unit 110. FIG. 2 is a schematic diagram illustrating interfaces to storage units of a flash storage according to an embodiment of the invention. The flash memory 10 may contain j+1 access sub-interfaces 170_0 to 170_j, where the access sub-interfaces may be referred to as channels, and each access sub-interface connects to i+1 storage sub-units. That is, i+1 storage sub-units may share the same access sub-interface. For example, assume that the flash memory contains 4 channels (j=3) and each channel connects to 4 storage sub-units (i=3): The flash memory 10 has 16 storage sub-units 180_0_1_3 0 to 180_j_i in total. The control unit 110 may direct one of the access sub-interfaces 170_0 to 170_j to read data from the designated storage sub-unit. Each storage sub-unit has an independent CE control signal. That is, it is required to enable a corresponding CE control signal when attempting to perform data read from a designated storage sub-unit via an associated access sub-interface. It is apparent that any number of channels may be provided in the flash memory 10, and each channel may be associated with any number of storage sub-units, and the invention should not be limited thereto. FIG. 3 is a schematic diagram depicting connections between one access sub-interface and multiple storage sub-units according to an embodiment of the invention. The processing unit 110, through the access sub-interface 170_0, may use independent CE control signals 320_0_0 to 320_0_i to select one of the connected storage sub-units 180_0_0 and 180_0_i, and then read data from the designated location of the selected storage sub-unit via the shared data line 310_0.

The access interface 150 stores the commands received from the host 160 in a command queue 130 according to their arrival times. Each command contains information regarding an opcode and an attribute. The opcode may identify the type of the command, such as a data read, a data write, a block erase etc. The attribute may contain a LUN (Logical Unit Number) at which data to be read or programmed, and a wide range of flags, enabling the processing unit 110 to classify the commands into priorities according to the attribute information. In order to enable the processing unit 110 to efficiently determine whether the command queue 130 stores commands of the high priorities to be processed, embodiments of the invention provide a command profile generator 120 and a command profile space 140 in the flash memory 10. The command profile space 140 includes multiple registers and each register stores a quantity indicating that the commands with a specified priority type are stored in the command queue 130. For example, the priority types from high to low are the highest priority, the $2^{nd}$-highest priority and the simple read/write. The command profile space 140 contains three registers to store three quantities of the highest priority, the $2^{nd}$-highest priority and the simple read/write commands that are stored in the command queue 130, respectively. The command profile generator 120 monitors all commands of the command queue 130 stored by the access interface 150 and updates the values of the three registers according to the attribute information of the commands. For example, a command having a predefined LUN indicates a read or write command with the highest priority. It should be noted that each LUN is associated with a physical region of the storage unit 18 and certain physical regions may be preset to store sensitive or important data. When detecting any command having a preset LUN, the command profile generator 120 adds one to the value of the highest-priority register. Moreover, attributes of a command may include a Head-of-Queue flag to indicate whether the command should be executed earlier than the other commands except for the highest-priority commands of the command queue 130. For example, the Head-of-Queue flag being logic "1" indicates that the command should be executed earlier than the other commands (except for the highest-priority commands) of the command queue 130. When detecting that the Head-of-Queue flag of any command is logic "1", the command profile generator 120 adds one to the value of the $2^{nd}$-highest priority register. The preset LUN(s) may be referred to as the highest-priority information and the Head-of-Queue flag may be referred to as the $2^{nd}$-highest priority information. The preset LUN(s) and the Head-of-Queue flag may be collectively referred to as priority information. Each time a command has been executed successfully, the processing unit 110 reads the value of the highest-priority register to determine whether any highest-priority command is present in the command queue 130. When the value of the highest-priority register is greater than 0, the processing unit 110 de-queues the first command with the highest priority from the command queue 130 and executes the command. When no highest-priority command is present in the command queue 130, the processing unit 110 reads the value of the $2^{nd}$-highest priority register to determine whether any $2^{nd}$-highest priority command is present in the command queue 130. When the value of the $2^{nd}$-highest priority register is greater than 0, the processing unit 110 de-queues the first command with the $2^{nd}$-highest priority from the command queue 130 and executes the command. When no $2^{nd}$-highest priority command is present in the command queue 130, the processing unit 110 employs a well-known algorithm to schedule and execute all commands of the command queue 130. Although embodiments of the invention describe three levels of the priority types, those skilled in the art may classify the commands of the command queue 130 into more or less priority types and the invention should not be limited thereto.

Figure 4:
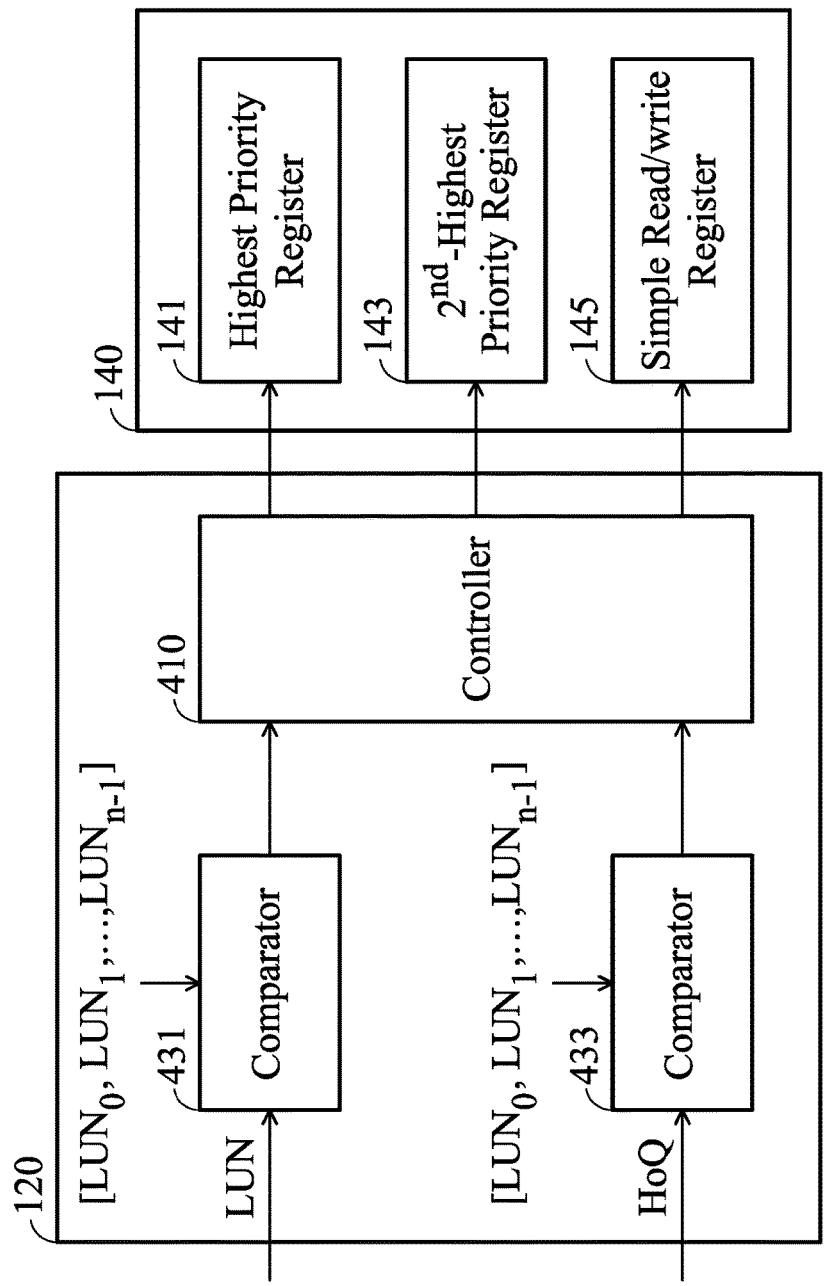
FIG. 4 is the block diagram of a command profile generator and a command profile space according to an embodiment of the invention.

FIG. 4 is the block diagram of a command profile generator and a command profile space according to an embodiment of the invention. The command profile space 140 includes a highest priority register 141, a $2^{nd}$-highest priority register 143 and a simple read/write register 145. The highest priority register 141, the $2^{nd}$-highest priority register 143 and the simple read/write register 145 are set to zero when the system is initiated. The command profile generator 120 includes a controller 410 and two comparators 431 and 433. The comparator 431 obtains the value of specific bits of each command as a LUN of the command and determines whether the LUN matches one of the predefined $LUN_0$ to $LUN_{n-1}$. In some embodiments, the preset $LUN_0$ to $LUN_{n-1}$ may be stored in a ROM (Read Only Memory, not shown in FIG. 1) or a SRAM (Static Random Access Memory, not shown in FIG. 1). In some embodiments, the preset $LUN_0$ to $LUN_{n-1}$ may be stored in the storage unit 180. After the system boots, the processing unit 110 directs the access interface 170 to read the preset $LUN_0$ to $LUN_{n-1}$ from the storage unit 180 and stores the $LUN_0$ to $LUN_{n-1}$ in a DRAM (Dynamic Random Access Memory). When detecting that the LUN matches the preset $LUN_0$ to $LUN_{n-1}$, the comparator 431 outputs logic "1" to the controller 410. Otherwise, the comparator 431 outputs logic "0" to the controller 410. The comparator 433 obtains a specific bit of each command as a HoQ (Head-of-Queue) flag and determines whether the HoQ flag is logic "1". When detecting that the HoQ flag is logic "1", the comparator 433 outputs logic "1" to the controller 410. Otherwise, the comparator 433 outputs logic "0" to the controller 410. The controller 410 adds one to the value of the highest priority register 141, the $2^{nd}$-highest priority register 143, or the simple read/write register 145 according to the outputs of the comparators 431 and 433. Specifically, when detecting that the comparator 431 outputs logic "1", the controller 410 adds one to the value of the highest priority register 141. When detecting that the comparator 433 outputs logic "1", the controller 410 adds one to the value of the $2^{nd}$-highest priority register 143. When detecting that both the comparators 431 and 433 output logic "0", the controller 410 adds one to the value of the simple read/write register 145. In some embodiments, those skilled in the art may remove the simple read/write register 145 from the command profile space 140 to reduce the cost of hardware.

Figure 5:
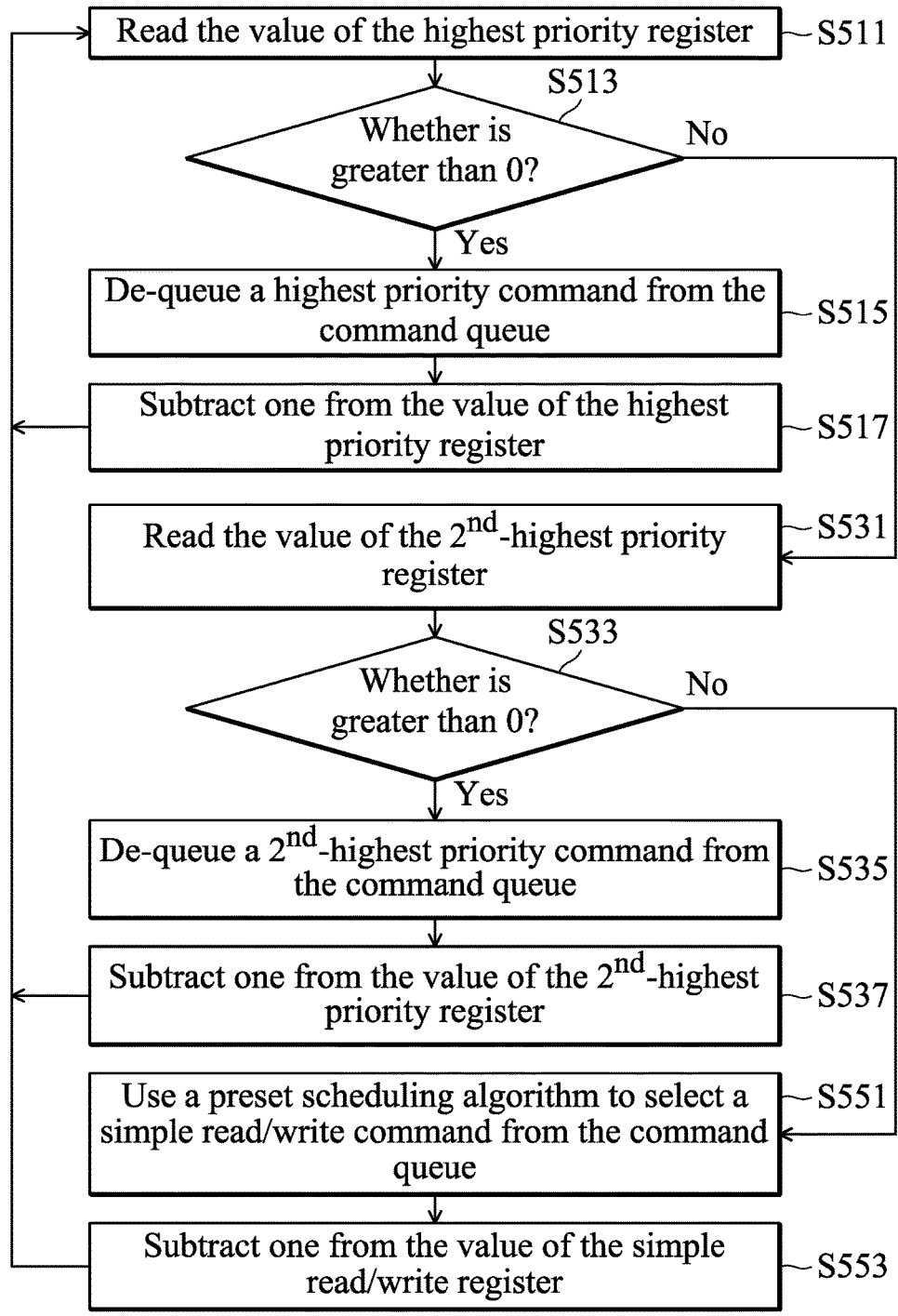
FIG. 5 is a flowchart illustrating a method for scheduling and executing commands in a flash memory.

FIG. 5 is a flowchart illustrating a method for scheduling and executing commands in a flash memory. The method is performed for scheduling and executing commands of the command queue 130 according to information stored in the command profile space 140 when the processing unit 110 loads and executes relevant microcode or firmware. In general, each time after executing one command of the command queue 130, the processing unit 110 reads the information stored in the command profile space 140 and accordingly determines whether a priority command (such as, the aforementioned highest and/or $2^{nd}$-highest priority command(s), and so on) is present in the command queue 130. When any priority command is present in the command queue 130, the processing unit 110 de-queues the priority command from the command queue 130 to execute. The priorities may be classified into one or more levels. When any higher priority command is present, the processing unit 110 has to execute the higher priority command first. Although the embodiments of the invention describe two levels of priority, those skilled in the art may devise a design to employ fewer or more levels of priority, and the invention should not be limited thereto. When no priority command is present, the processing unit 110 uses a preset scheduling algorithm to select a simple read/write command from the command queue 130 to execute. For example, the scheduling algorithm may select the earliest arrived command, a command with the same type (such as, read or write) as that of the last executed command before a particular timer has expired, a command with a different type from that of the last executed command (also referred to as a round-robin algorithm), a read or write command that can form a successive read or write together with the last executed command before a particular timer has expired, or others, from the command queue 130. Comparing with a conventional full scan to the commands of the command queue 130 to determine whether a priority command is present, the processing unit 110 described in the embodiments of the invention provides a more efficient way to read the information stored in the command profile space 140 to complete the determination. That is, the processing unit 110 determines whether a priority command is present without scanning the commands of the command queue 130, yielding an improved performance in the command scheduling.

Specifically, in each iteration, the processing unit 110 reads the value of the highest priority register 141 (step S511) and determines whether the value of the highest priority register 141 is greater than 0 (step S13). When the value of the highest priority register 141 is greater than 0 (the "Yes" path of step S513), the processing unit 110 de-queues a highest priority command from the command queue 130 to execute (step S515) and subtracts one from the value of the highest priority register 141 (step S517). In step S515, the other commands (such as $2^{nd}$-highest priority commands and/or simple read/write commands) that were arrived before the highest priority command may be maintained in the command queue 130, or popped out of the command queue 130 and cached in a SRAM (not shown in FIG. 1). When the value of the highest priority register 141 is not greater than 0 (the "No" path of step S513), the processing unit 110 reads the value of the $2^{nd}$-highest priority register 143 (step S531) and determines whether the value is greater than 0 (step S533). When the value of the $2^{nd}$-highest priority register 143 is greater than 0 (the "Yes" path of step S533), the processing unit 110 de-queues a $2^{nd}$-highest priority command from the command queue 130 to execute (step S535) and subtracts one from the value of the $2^{nd}$-highest priority register 143 (step S537). In step S535, the other commands (such as simple read/write commands) that were arrived before the $2^{nd}$-highest priority command may be maintained in the command queue 130, or popped out of the command queue 130 and cached in a SRAM (not shown in FIG. 1). When the value of the $2^{nd}$-highest priority register 143 is not greater than 0 (the "No" path of step S533), the processing unit 110 uses a preset scheduling algorithm to select a simple read/write command from the command queue 130 to execute (step S551) and subtracts one from the value of the simple read/write register 145 (step S553).

Although the embodiment has been described as having specific elements in FIGS. 1 to 4, it should be noted that additional elements may be included to achieve better performance without departing from the spirit of the invention. While the process flow described in FIG. 5 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for scheduling and executing commands in a flash memory, performed by a processing unit, comprising:
   reading information stored in a command profile space to determine whether a priority command is present in a command queue;
   de-queuing the priority command from the command queue and executing the priority command when the priority command is present in the command queue; and
   using a scheduling algorithm to select a simple read/write command from the command queue and executing the simple read/write command when no priority command is present in the command queue,
   wherein a command profile generator monitors all commands being stored in the command queue by an access interface and updates the information stored in the command profile space according to attribute information of the commands,
   wherein the command profile space comprises a highest priority register and a $2^{nd}$-highest priority register,
   wherein the command profile generator adds one to a value of the highest priority register each time highest priority information from the attribute information of one command is detected, and
   wherein the command profile generator adds one to a value of the $2^{nd}$-highest priority register each time $2^{nd}$-highest priority information from the attribute information of one command is detected.

2. The method of claim 1, wherein a host issues the priority command and the simple read/write command.

3. The method of claim 1, wherein the step of reading the information stored in the command profile space to determine whether a priority command is present in the command queue comprises:
   reading the information stored in the command profile space and accordingly determining whether a highest priority command is present in the command queue; and
   determining whether a $2^{nd}$-highest priority command is present in the command queue according to the information stored in the command profile space when no highest priority command is present in the command queue,
   wherein the step of de-queuing the priority command from the command queue and executing the priority command when the priority command is present in the command queue comprises:
   de-queuing the highest priority command from the command queue and executing the highest priority command when the highest priority command is present in the command queue; and
   de-queuing the 2nd-highest priority command from the command queue and executing the 2nd-highest priority command when the 2nd-highest priority command is present in the command queue,
   wherein the step of using a scheduling algorithm to select the simple read/write command from the command queue and executing the simple read/write command when no priority command is present in the command queue comprises:
   using the scheduling algorithm to select the simple read/write command from the command queue and executing the simple read/write command when the highest priority command and the 2nd-highest priority command are not present in the command queue.

4. The method of claim 1, wherein the highest priority information comprises one of predefined LUNs (Logical Unit Numbers) and the $2^{nd}$-highest priority information comprises a HoQ (Head-Of-Queue) flag being logic "1".

5. The method of claim 1, wherein the step of reading the information stored in the command profile space to determine whether the highest priority command is present in the command queue comprises:
   reading the value of the highest priority register and determining whether the value of the highest priority register is greater than zero, and
   wherein the step of determining whether the $2^{nd}$-highest priority command is present in the command queue according to the information stored in the command profile space when no highest priority command is present in the command queue comprises:
   reading the value of the $2^{nd}$-highest priority register and determining whether the value of the $2^{nd}$-highest priority register is greater than zero when the value of the highest priority register is not greater than zero.

6. An apparatus for scheduling and executing commands in a flash memory, comprising:
   a command queue;
   a command profile space; and
   a command profile generator, coupled to the command queue and the command queue, monitoring all commands being stored in the command queue by an access interface, and updating information stored in the command profile space according to attribute information of the commands, thereby enabling a processing unit to determine whether a priority command is present in the command queue according to the information stored in the command queue,
   wherein the command profile space comprises a highest priority register and a $2^{nd}$-highest priority register, the command profile generator adds one to a value of the highest priority register each time highest priority information from the attribute information of one command is detected, and the command profile generator adds one to a value of the $2^{nd}$-highest priority register each time $2^{nd}$-highest priority information from the attribute information of one command is detected.

7. The apparatus of claim 6, wherein the processing unit does not scan the commands of the command queue to determine whether the priority command is present in the command queue.

8. The apparatus of claim 6, wherein a host issues the commands to the access interface for accessing data of a storage unit.

9. The apparatus of claim 6, wherein the highest priority information comprises one of predefined LUNs (Logical Unit Numbers) and the $2^{nd}$-highest priority information comprises a HoQ (Head-Of-Queue) flag being logic "1".

10. The apparatus of claim 9, comprising:
   a processing unit, coupled to the command profile space and the command queue, reading the value of the highest priority register and determining whether the value of the highest priority register is greater than zero; de-queuing a highest priority command from the command queue and executing the highest priority command when the value of the highest priority register is greater than zero; reading the value of the $2^{nd}$-highest priority register and determining whether the value of the $2^{nd}$-highest priority register is greater than zero when the value of the highest priority register is not greater than zero; de-queuing a $2^{nd}$-highest priority command from the command queue and executing the $2^{nd}$-highest priority command when the value of the $2^{nd}$-highest priority register is greater than zero; and using a scheduling algorithm to select a simple read/write command from the command queue and executing the simple read/write command when the value of the $2^{nd}$-highest priority register is not greater than zero.

11. The apparatus of claim 6, wherein the command profile generator comprises:
   a first comparator, obtaining a first LUN of each command; determining whether the first LUN matches a second LUN; outputting logic "1" when the first LUN matches the second LUN; and outputting logic "0" when the first LUN does not match the second LUN;
   a second comparator, obtaining a HoQ (Head-Of-Queue) flag of each command; determining whether the HoQ flag is logic "1"; outputting logic "1" when the HoQ flag is logic "1"; and outputting logic "0" when the HoQ flag is logic "0"; and
   a controller, coupled to the first comparator, the second comparator, the highest priority register and $2^{nd}$-highest priority register; adding one to the value of the highest priority register when the first comparator outputs logic "1"; and adds one to the value of the $2^{nd}$-highest priority register when the second comparator outputs logic "1".

* * * * *